United States Patent [19]

Imafuku et al.

[11] Patent Number: 5,433,754

[45] Date of Patent: Jul. 18, 1995

[54] DISPERSE DYE COMPOSITION AND DYEING METHOD EMPLOYING IT

[75] Inventors: Hideaki Imafuku; Kaoru Fujikawa; Toshikazu Tamiya; Kuniko Kira, all of Kitakyushu, Japan

[73] Assignee: Hoechst Mitsubishi Kasai Co., Ltd., Tokyo, Japan

[21] Appl. No.: 210,299

[22] Filed: Mar. 18, 1994

[30] Foreign Application Priority Data

Apr. 19, 1993 [JP] Japan .................. 5-115340

[51] Int. Cl.⁶ .......................... D06P 3/82; D06P 3/54; C09B 29/00
[52] U.S. Cl. ........................... 8/529; 8/638; 8/639; 8/643; 8/922
[58] Field of Search .............. 8/529, 638–643, 8/922

[56] References Cited

U.S. PATENT DOCUMENTS 4,626,257 12/1986 Matsuo et al. .................. 8/638

FOREIGN PATENT DOCUMENTS 0083553 7/1983 European Pat. Off. .
0164223 12/1985 European Pat. Off. .
1280805 10/1968 Germany .
4002767 9/1990 Germany .

OTHER PUBLICATIONS

Patent Abstracts of Japan, vol. 8, No. 145 (C-232)(1582), Jul. 6, 1984, JP-A-59 51950, Mar. 26, 1984.

*Primary Examiner*—Paul Lieberman
*Assistant Examiner*—Margaret Einsmann
*Attorney, Agent, or Firm*—Oblon, Spivak, McClelland, Maier & Neustadt

[57] ABSTRACT

A disperse dye composition comprising:
(A) a yellow dye mixture comprising from 20 to 60 wt % of a compound of the following formula (I) and from 80 to 40 wt % of a compound of the following formula (II) (the sum of (I) and (II) is 100 wt %):

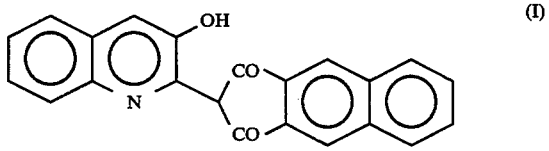

wherein each of $X^1$ and $X^2$ which are independent of each other, is a halogen atom, and $R^1$ is $-C_2H_4CN$ or $-C_2H_4OCOC_6H_5$, and (B) a blue dye mixture comprising from 75 to 95 wt % of a compound of the following formula (III) and from 25 to 5 wt % of the following formula (IV) (the sum of (III) and (IV) is 100 wt %):

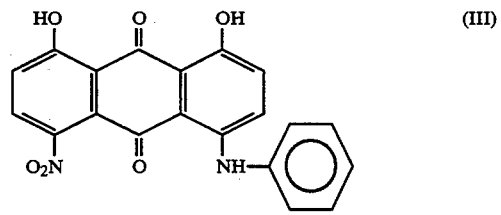

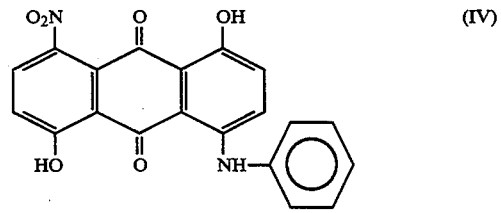

and/or
(C) a red dye of the following formula (V):
(Abstract continued on next page.)

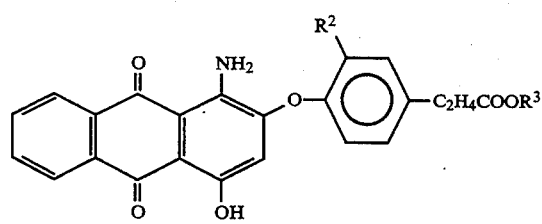
(V)
wherein each of $R^2$ and $R^3$ which are independent of each other, is a methyl group or an ethyl group.
10 Claims, No Drawings

DISPERSE DYE COMPOSITION AND DYEING METHOD EMPLOYING IT

The present invention relates to a disperse dye composition suitable for dyeing a fiber mixture product comprising polyester fibers having different deniers, particularly a combined filament yarn fabric or union cloth product comprising fine denier polyester fibers and regular denier polyester fibers (hereinafter referred to as a different denier polyester fiber product).

Dyeing of a different denier polyester fiber product comprising fine denier polyester fibers of e.g. from 0.1d to 0.7d and regular denier polyester fibers of e.g. from 1d to 5d is carried out usually by a conventional dyeing method with a known disperse dye. However, such dyeing has a problem that the dyed product has a color difference between fibers in use (i.e. poor in solid dyeing) or undergoes a substantial decrease in fastness.

Due to the difference in the specific surface areas of the constituting fibers, the different denier polyester fiber product has a difference in the dyeing behavior of the dye, whereby a color difference between fibers in use or a decrease in fastness will result.

The present inventors have conducted extensive studies on the above problem and as a result have found it possible to solve the problem by using a disperse dye composition comprising:

(A) a yellow dye mixture comprising from 20 to 60 wt % of a compound of the following formula (I) and from 80 to 40 wt % of a compound of the following formula (II) (the sum of (I) and (II) is 100 wt %):

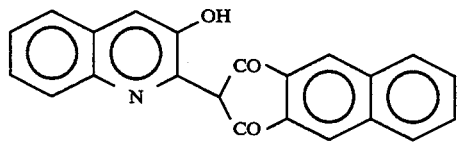

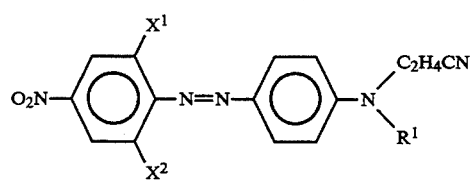

wherein each of $X^1$ and $X^2$ which are independent of each other, is a halogen atom, and $R^1$ is —$C_2H_4CN$ or —$C_2H_4OCOC_6H_5$, and (B) a blue dye mixture comprising from 75 to 95 wt % of a compound of the following formula (III) and from 25 to 5 wt % of the following formula (IV) (the sum of (III) and (IV) is 100 wt %):

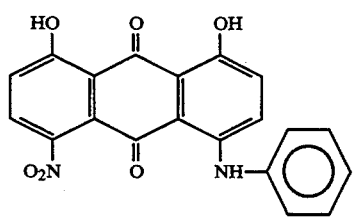

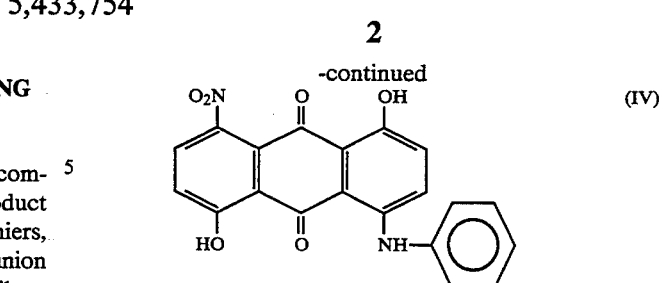

and/or (C) a red dye of the following formula (V):

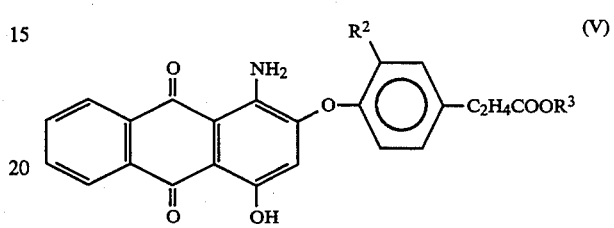

wherein each of $R^2$ and $R^3$ which are independent of each other, is a methyl group or an ethyl group.

Now, the present invention will be described in detail with reference to the preferred embodiments.

In the yellow dye mixture (A), the ratio of the dye of the formula (I) to the dye of the formula (II) is from 20 to 60 wt %:from 80 to 40 wt %, preferably from 30 to 50 wt %:from 70 to 50 wt %. The halogen atom for each of $X^1$ and $X^2$ in the formula (II) may, for example, be a chlorine atom or a bromine atom, preferably a chlorine atom.

In the blue dye mixture (B), the ratio of the dye of the formula (III) to the dye of the formula (IV) is from 75 to 95 wt %:from 25 to 5 wt %, preferably from 80 to 90 wt %:from 20 to 10 wt %.

If the ratio of (I) to (II), or the ratio of (III) to (IV), is outside the above range, a color difference between fibers in use will result, such being undesirable.

Each of $R^2$ and $R^3$ in the formula (V) for the red dye (C) is preferably a methyl group.

The proportions of the yellow dye mixture (A), and the blue dye mixture (B) and/or the red dye (C) are such that per 100 parts by weight of the yellow dye mixture (A), the blue dye mixture (B) is from 0.1 to 100,000 parts by weight, preferably from 1 to 10,000 parts by weight, and the red dye (C) is from 0.1 to 100,000 parts by weight, preferably from 1 to 10,000 parts by weight. The proportions are suitably selected within these ranges to obtain a desired color.

In the disperse dye composition of the present invention, the yellow dye mixture (A) is incorporated so that it is compatible with the blue dye mixture (B) or the red dye (C), whereby no color difference between fibers in use will result even when the ratio of (B) or (C) to (A) is varied.

Now, the present invention will be described in further detail with reference to Examples.

EXAMPLE 1

A union cloth product comprising 50 parts by weight of fine denier polyester fibers (0.1d) and 50 parts by weight of regular denier polyester fibers (2d), was dyed by a conventional method under the dyeing conditions and with the recipe as identified in Table 1.

TABLE 1

| | | | |
|---|---|---|---|
| Yellow components | [structure (1): 3-hydroxyquinoline fused with naphthalene dicarbonyl] | (1):(2) 41 wt %: 59 wt % | 0.296% o.w.f. |
| | [structure (2): 2,6-dichloro-4-nitrophenyl azo compound with N(C₂H₄CN)(C₂H₄OCO-phenyl) group] | | |
| Red component | [structure: 1-amino-4-hydroxy-2-(methyl-C₂H₄COOCH₃-phenoxy)anthraquinone] | | 0.607% o.w.f. |
| Blue components | [structure (3): anthraquinone with HO, OH, O₂N, NH-phenyl substituents] | (3):(4) 85 wt %: 15 wt % | 0.925% o.w.f. |
| | [structure (4): anthraquinone with O₂N, OH, OH, NH-phenyl substituents] | | |
| Dispersing and leveling agent: Eganal LMD-J (Product of Hoechst Japan Limited) | | | 1 g/l |
| pH adjusting agent/buffer: acetic acid/sodium acetate | | | adjusted to pH 5 |
| Bath ratio 1:10 | | | |
| Temp × Time 120° C. × 45 min. | | | |

Then, the dyed cloth was subjected to reduction cleaning treatment at 80° C. for 10 minutes at a bath ratio of 1:30 using an aqueous solution containing 1 g/l of Hostapal LFB conc (cleaning agent, manufactured by Hoechst Japan Limited), 2 g/l of sodium hydroxide (flakes) and 2 g/l of hydrosulfite, and then subjected to heat setting at 180° C. for 1 minute. The dyed cloth thus treated, was evaluated with respect to the following items by conventional methods.

Color difference between fibers in use:

Using 2d fibers as the standard, the relative value of CIE L*a*b* of 0.1d fibers were measured, and the degree of solid dyeing was evaluated and the results are shown in Table 5.

Fastness:

The color fastness to light was measured in accordance with JIS L0842−1988 (carbon-arc lamp test, evaluated by blue scale), and the color fastness to washing was measured in accordance with AATCC test method 61-1989 (test number 2A, WOB standard cleaning agent, multifiber test cloth No. 10A, evaluated by gray scale for assessing staining), and the results are shown in Table 5.

EXAMPLE 2

The dyeing and evaluation were conducted in the same manner as in Example 1 except that the recipe was changed as identified in Table 2. The results are shown in Table 5.

TABLE 2

| Yellow components | [structure (1): 3-hydroxyquinoline linked via CH to naphthalene-2,3-dicarbonyl dioxolane] | (1):(2) 42 wt %: 58 wt % | 0.203% o.w.f. |
| --- | --- | --- | --- |
| | [structure (2): 2,6-dichloro-4-nitrophenyl-azo-phenyl-N(C₂H₄CN)₂] | | |
| Red component | [structure: 1-amino-4-hydroxy-2-(2-methyl-4-(C₂H₄COOCH₃)phenoxy)anthraquinone] | | 0.607% o.w.f. |
| Blue components | [structure (3): 1,8-dihydroxy-4-nitro-5-anilino-anthraquinone] | (3):(4) 85 wt %: 15 wt % | 0.925% o.w.f. |
| | [structure (4): 1,8-dihydroxy-5-nitro-4-anilino-anthraquinone] | | |

EXAMPLE 3

The dyeing and evaluation were conducted in the same manner as in Example 1 except that the recipe was changed as shown in Table 3. The results are shown in Table 5.

TABLE 3

| Yellow components | [structure (1): 3-hydroxyquinoline linked via CH to naphthalene-2,3-dicarbonyl dioxolane] | (1):(2) 41 wt %: 59 wt % | 0.06% o.w.f. |
| --- | --- | --- | --- |
| | [structure (2): 2,6-dichloro-4-nitrophenyl-azo-phenyl-N(C₂H₄CN)(C₂H₄OCO-phenyl)] | | |

TABLE 3-continued

| | | |
|---|---|---|
| Red component | [anthraquinone structure: 1-amino-2-(2-methyl-4-(C$_2$H$_4$COOCH$_3$)phenoxy)-4-hydroxyanthraquinone] | 0.05% o.w.f. |
| Blue components | [structure (3): 1,8-dihydroxy-4-anilino-5-nitroanthraquinone]<br>[structure (4): 1,5-dihydroxy-4-anilino-8-nitroanthraquinone] | (3):(4) 85 wt %: 15 wt % 0.16% o.w.f. |

COMPARATIVE EXAMPLE 1

The dyeing and evaluation were conducted in the same manner as in Example 1 except that the recipe was changed as shown in Table 4. The results are shown in Table 5.

TABLE 4

| | | |
|---|---|---|
| Yellow component | [quinoline-naphthalene dione structure with OH] | 0.248% o.w.f. |
| Red component | [anthraquinone structure: 1-amino-2-(2-methyl-4-(C$_2$H$_4$COOCH$_3$)phenoxy)-4-hydroxyanthraquinone] | 0.607% o.w.f. |
| Blue components | [structure (1): 1,8-dihydroxy-4-anilino-5-nitroanthraquinone]<br>[structure (2): 1,5-dihydroxy-4-anilino-8-nitroanthraquinone] | (1):(2) 85 wt %: 15 wt % 0.925% o.w.f. |

TABLE 5

| | Evaluated items | | | | |
|---|---|---|---|---|---|
| | Color difference between fibers in use CIP L*a*b* (2d fiber Std.) | | | Color fastness on 0.1d fiber | | |
| | | | | Color fastness to light (carbon-arc lamp) | Color fastness to washing (AATCC 2A) | |
| | ΔL* | Δa* | Δb* | | Acetate stain | Nylon stain |
| Example 1 | 4.55 | 1.11 | −0.83 | 5–6 grade | 4–5 grade | 5⁻ grade |
| Example 2 | 4.44 | 0.71 | −1.26 | 5–6 grade | 4–5 grade | 4–5 grade |
| Example 3 | −1.92 | 0.39 | 0.14 | 5–6 grade | 5 grade | 5 grade |
| Comparative Example 1 | 4.11 | 1.27 | −3.58 | 5–6 grade | 4–5 grade | 5⁻ grade |

As is shown in Table 5, the differences between ΔL*, Δa* and Δb* of Examples 1 to 3 are less than that of Comparative Example 1, which means the disperse dye composition of the present invention is capable of presenting an excellent dyed product with no substantial color difference between fibers in use even when used for dyeing a different denier polyester fiber product.

We claim:

1. A disperse dye composition, comprising:

(A) a yellow dye mixture comprising from 20 to 60 wt. % of a compound of the following formula (I) and from 80 to 40 wt. % of a compound of the following formula (II), the sum of (I) and (II) being 100 wt. %:

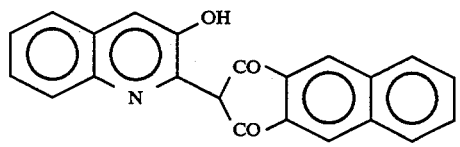

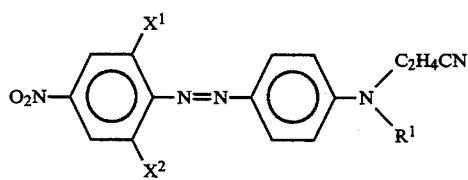

wherein each of $X^1$ and $X^2$, which are independent of each other, is a halogen atom; and $R^1$ is —$C_2H_4CN$ or —$C_2H_4OCOC_6H_5$, and (B) a blue dye mixture consisting essentially of from 75 to 95 wt. % of a compound of the following formula (III) and from 25 to 5 wt. % of a compound of the following formula (IV), the sum of (III) and (IV) being 100 wt. %:

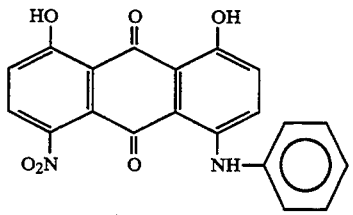

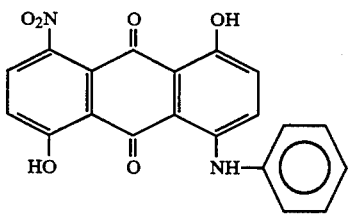

or (c) a red dye compound of the following formula (V):

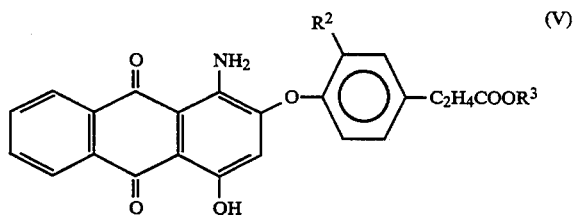

wherein each of $R^2$ and $R^3$ which are independent of each other, is a methyl group or an ethyl group, or both of (B) and (C).

2. The disperse dye composition according to claim 1, wherein the weight ratio of the yellow dye mixture:the blue dye mixture is 100:0.1 to 100,000.

3. The disperse dye composition according to claim 1, wherein the weight ratio of the yellow dye mixture:the red dye is 100:0.1 to 100,000.

4. The disperse dye composition according to claim 1, wherein the weight ratio of the yellow dye mixture:the blue dye mixture:the red dye is 100:0.1 to 100,000:0.1 to 100,000.

5. The disperse dye composition according to any one of claims 1, 3 or 4, wherein in the formula (II), each of $X^1$ and $X^2$ is a chlorine atom, and $R^1$ is —$C_2H_4CN$ or —$C_2H_4OCOC_6H_5$, and in the formula (V), each of $R^2$ and $R^3$ is a methyl group.

6. A dyed product obtained by dyeing a combined filament yarn fabric or union cloth product comprising fine denier polyester fibers of from 0.1d to 0.7d and regular denier polyester fibers of from 1d to 5d with the disperse dye composition as defined in claim 1.

7. A method for dyeing a combined filament yarn fabric or union cloth product, comprising fine denier polyester fibers of from 0.1 d to 0.7 d and regular denier polyester fibers of from 1 d to 5 d, which method comprises dyeing said filament yarn fabric with a disperse dye composition as defined in claim 1.

8. The disperse dye composition according to claim 1, wherein in said yellow dye mixture (A), from 30 to 50 wt % of compound (I) and from 70 to 50 wt. % of compound (II) is used.

9. The disperse dye composition according to claim 1, wherein each of $X^1$ and $X^2$ is chlorine.

10. The disperse dye composition according to claim 1, wherein in said blue dye mixture (b), from 80 to 90 wt. % of compound (III) and from 20 to 10 wt. % of compound (IV) is used.

* * * * *

UNITED STATES PATENT AND TRADEMARK OFFICE
CERTIFICATE OF CORRECTION

PATENT NO. : 5,433,754
DATED : July 18, 1995
INVENTOR(S) : Hideaki IMAFUKU, et al.

It is certified that error appears in the above-indentified patent and that said Letters Patent is hereby corrected as shown below:

On the title page, Item [73], the Assignee should read:

--Hoechst Mitsubishi Kasei Co., Ltd., Tokyo, Japan--

Signed and Sealed this

Twenty-ninth Day of August, 1995

Attest:

BRUCE LEHMAN

*Attesting Officer*     *Commissioner of Patents and Trademarks*